(12) United States Patent
Kamemura

(10) Patent No.: US 10,594,071 B2
(45) Date of Patent: Mar. 17, 2020

(54) CHARGING INLET WITH A DRAINAGE PORT IN A PERIPHERAL WALL

(71) Applicant: Sumitomo Wiring Systems, Ltd., Yokkaichi, Mie (JP)

(72) Inventor: Masato Kamemura, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 16/346,567

(22) PCT Filed: Nov. 8, 2017

(86) PCT No.: PCT/JP2017/040186
§ 371 (c)(1),
(2) Date: May 1, 2019

(87) PCT Pub. No.: WO2018/092646
PCT Pub. Date: May 24, 2018

(65) Prior Publication Data
US 2019/0267749 A1  Aug. 29, 2019

(30) Foreign Application Priority Data

Nov. 21, 2016 (JP) .................................. 2016-225850

(51) Int. Cl.
*H01R 13/74* (2006.01)
*H01R 13/52* (2006.01)
(Continued)

(52) U.S. Cl.
CPC .......... *H01R 13/5202* (2013.01); *B60L 53/16* (2019.02); *H01R 13/46* (2013.01);
(Continued)

(58) Field of Classification Search
CPC ............ H01R 13/5227; H01R 2201/26; H01R 13/74; H01R 13/748
(Continued)

(56) References Cited

U.S. PATENT DOCUMENTS 8,597,039 B2 * 12/2013 Osawa ............... H01R 13/5227
439/205
2013/0078846 A1    3/2013 Sasaki et al.
(Continued)

FOREIGN PATENT DOCUMENTS

JP    2011-175764    9/2011
JP    2015-103379    6/2015
(Continued)

OTHER PUBLICATIONS

International Search Report dated Jan. 30, 2019.

*Primary Examiner* — Abdullah A Riyami
*Assistant Examiner* — Justin M Kratt
(74) *Attorney, Agent, or Firm* — Gerald E. Hespos; Michael J. Porco; Matthew T. Hespos

(57) ABSTRACT

A charging inlet 10 disclosed by this specification includes a plate 50 provided with a connector insertion hole 51, and an inlet body 20 having a connector fitting portion 22 to be inserted into the connector insertion hole 51, the inlet body 20 being fixed to the plate 50. The connector fitting portion 22 includes a peripheral wall 25 having a cylindrical shape and a lock portion 34 provided on an outer peripheral surface of the peripheral wall 25. The connector insertion hole 51 includes a peripheral wall accommodation space 56 having the peripheral wall 25 accommodated therein and a lock portion accommodation space 57 having the lock portion 34 accommodated therein. The peripheral wall 25 is provided with drainage ports 39 allowing communication between the lock portion accommodation space 57 and the inside of the peripheral wall 25.

3 Claims, 11 Drawing Sheets

(51) Int. Cl.
*B60L 53/16* (2019.01)
*H01R 13/46* (2006.01)
*H01R 13/512* (2006.01)

(52) U.S. Cl.
CPC .......... *H01R 13/52* (2013.01); *B60L 2270/00* (2013.01); *H01R 13/512* (2013.01); *H01R 13/5227* (2013.01); *H01R 13/74* (2013.01); *H01R 13/748* (2013.01); *H01R 2201/26* (2013.01)

(58) Field of Classification Search
USPC ................................ 439/205, 548, 556, 559
See application file for complete search history.

(56) References Cited

U.S. PATENT DOCUMENTS

| | | | |
|---|---|---|---|
| 2015/0343914 A1 | 12/2015 | Osawa | |
| 2016/0248195 A1* | 8/2016 | Feldner | ................ H01R 13/502 |
| 2017/0229804 A1* | 8/2017 | Kurita | ................ H01R 13/5202 |

FOREIGN PATENT DOCUMENTS

| | | |
|---|---|---|
| JP | 2015-225771 | 12/2015 |
| JP | 2016-51673 | 4/2016 |
| JP | 2016-72003 | 5/2016 |

\* cited by examiner

CHARGING INLET WITH A DRAINAGE PORT IN A PERIPHERAL WALL

BACKGROUND

Field of the Invention

This specification relates to a charging inlet.

Related Art

Japanese Unexamined Patent Publication No. 2015-103379 discloses a vehicle-side connector to which a charging connector connected to a charger is connectable from the front. The vehicle-side connector includes a housing body, and this housing body includes a connector fitting portion into which the charging connector can fit. A substantially U-shaped lock fitting surrounds a locked portion to be locked by a lock arm of the charging connector.

The above-described vehicle-side connector is provided with a drainage port for draining water that has intruded into the lock fitting portion toward the connector fitting portion. The drainage port allows communication between the inside of the lock fitting portion and the inside of the connector fitting portion by providing a hole extending across a separation wall separating the lock fitting portion and the connector fitting portion. Such a drainage port generally is formed by removing a mold rearward, and therefore a mold removal hole needs to be closed with a rubber plug. Thus, a rubber plug holder is needed for holding the rubber plug such that the rubber plug does not come out from the mold removal hole, and the number of components increases and an assembling operation becomes cumbersome.

SUMMARY

A charging inlet disclosed by this specification includes a plate provided with a connector insertion hole. An inlet body is fixed to the plate and includes a connector fitting portion to be inserted into the connector insertion hole. The connector fitting portion includes a peripheral wall having a cylindrical shape and a lock is provided on an outer peripheral surface of the peripheral wall. The connector insertion hole includes a peripheral wall accommodation space having the peripheral wall accommodated therein and a lock accommodation space having the lock accommodated therein. The peripheral wall is provided with a drainage port allowing communication between the lock accommodation space and the inside of the peripheral wall.

According to this configuration, the drainage port is provided in the peripheral wall of the connector fitting portion. Thus, no drainage port needs to be provided in a rear part of the connector fitting portion. Further, since the plate is provided with the peripheral wall accommodation space and the lock accommodation space, the outer peripheral surface of the peripheral wall is facing outside before the inlet body and the plate are assembled and the drainage port can be provided by laterally removing a mold when molding the inlet body. Thus, it is possible to reduce the number of components and, hence, assembly is easier.

The inlet body may include a base plate and the peripheral wall may project on the base plate. The drainage port may be provided at a position in contact with the base plate. The charging inlet generally is attached in such a posture as to face obliquely up to a body of a vehicle. Thus, water pooled on the side of the base plate can be drained directly through the drainage port by providing the drainage port at the position in contact with the base plate. The drainage port may be provided in a lower end part of the lock accommodation space in the outer peripheral surface of the peripheral wall. According to this configuration, water having intruded into the lock accommodation space can easily flow into the peripheral wall accommodation space through the drainage port after flowing down to the lower end part of the lock accommodation space along the outer peripheral surface of the peripheral wall.

According to the charging inlet disclosed by this specification, it is possible to reduce the number of components and to facilitate assembly.

DETAILED DESCRIPTION

Figure 1:
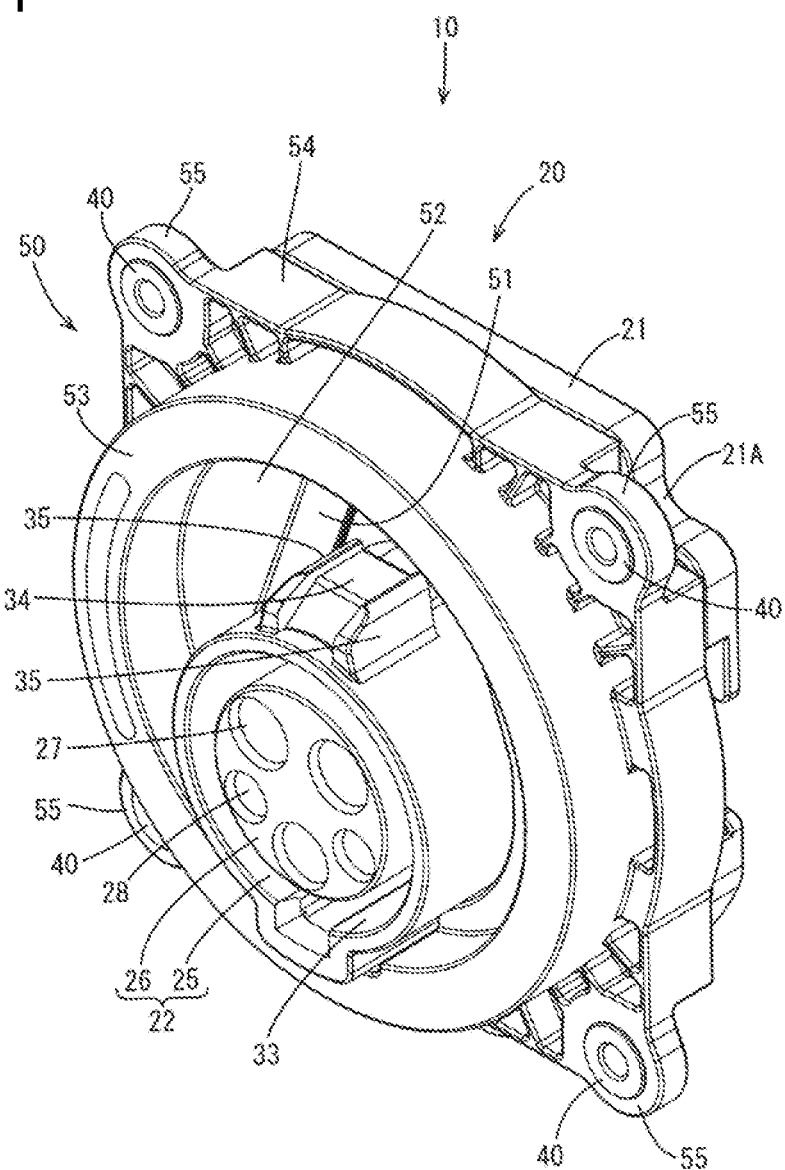
FIG. 1 is a perspective view of a charging inlet obliquely viewed from front.
Figure 2:
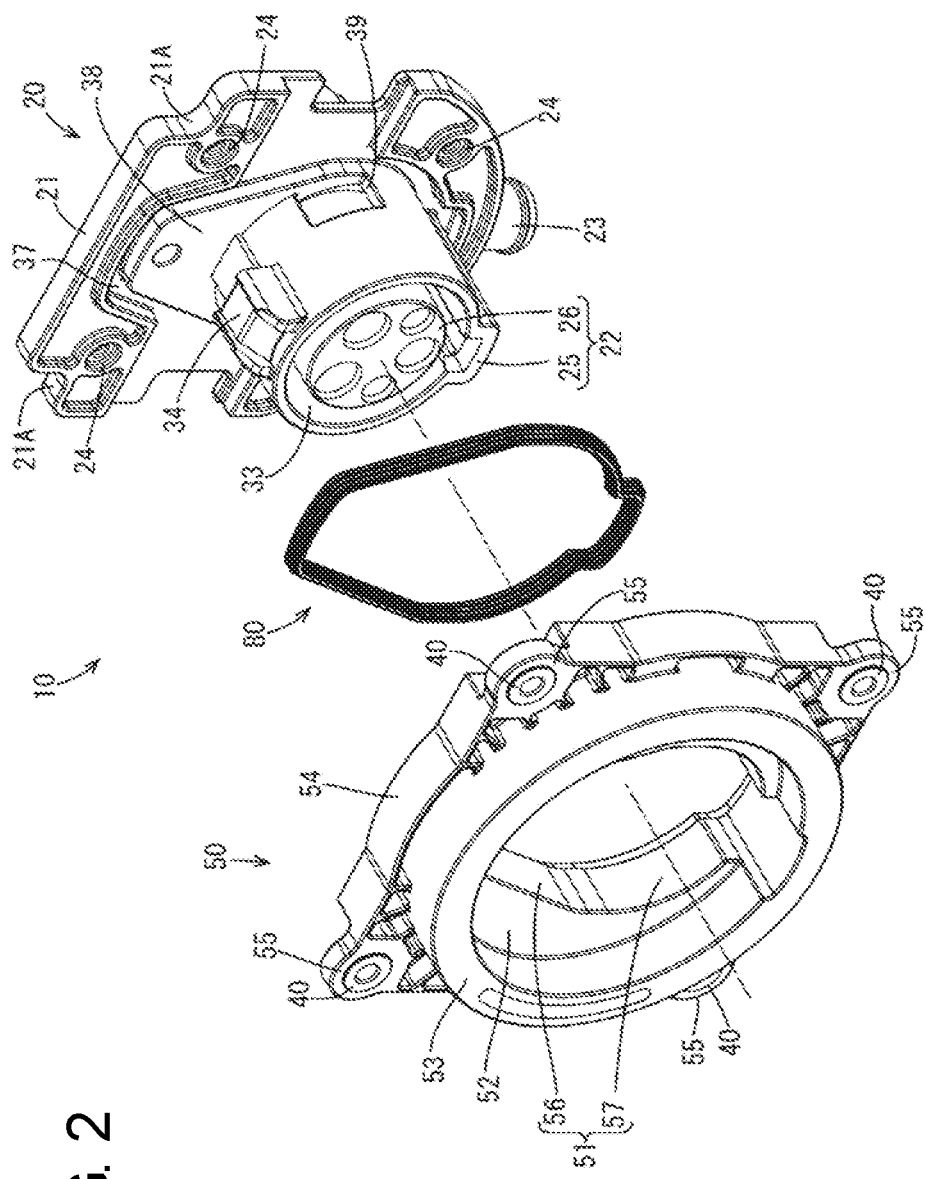
FIG. 2 is an exploded perspective view showing constituent components of the charging inlet.
Figure 5:
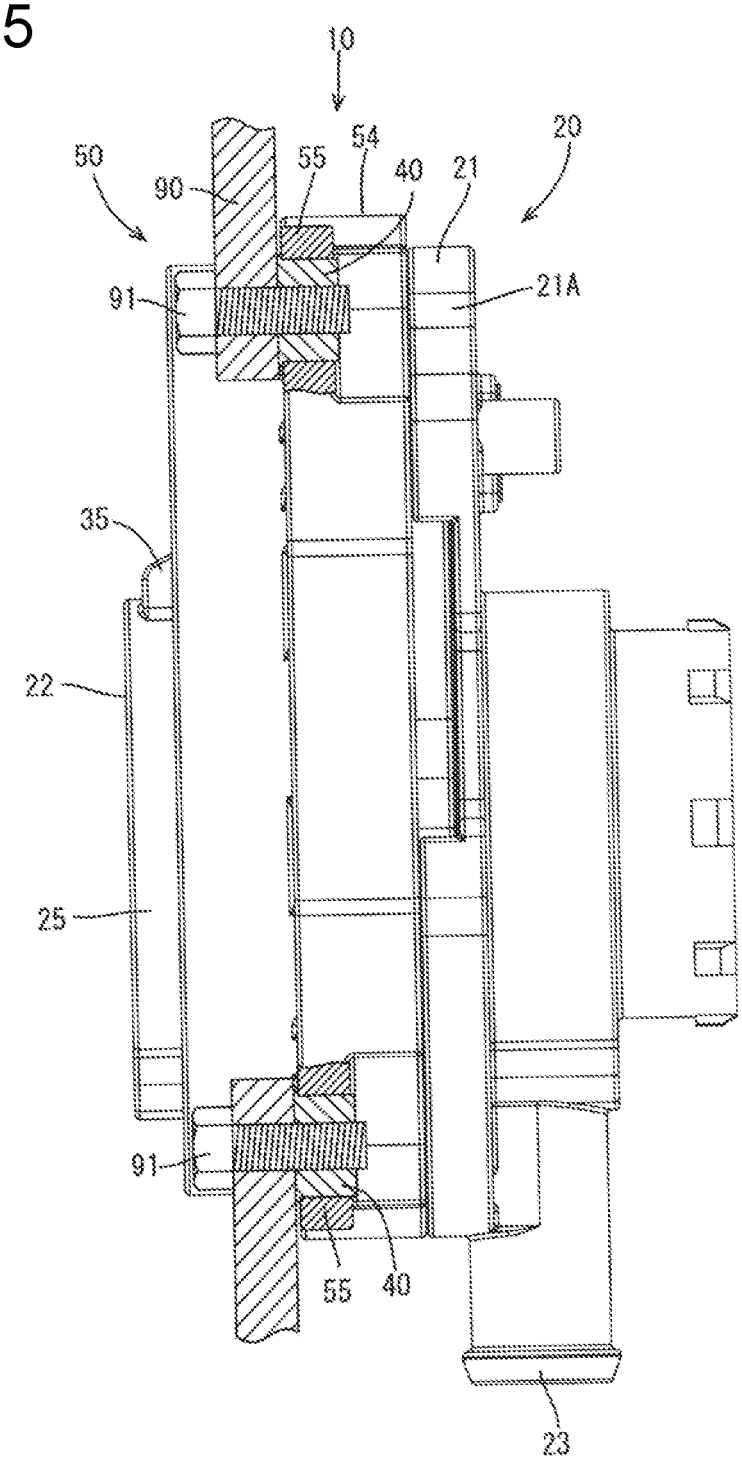
FIG. 5 is a side view partly in section showing a state where the charging inlet is fixed to a body of a vehicle.

An embodiment is described with reference to FIGS. 1 to 11. A charging inlet 10 in this embodiment includes an inlet body 20, a holding plate (hereinafter, referred to as a "plate") 50 and a sealing member 80, as shown in FIGS. 1 and 2. The charging inlet 10 is attached in such a posture as to face obliquely up to a body 90 of a vehicle. However, to facilitate understanding, a state where the charging inlet 10 is attached in a horizontal posture on the body 90 is shown in FIG. 5. A battery equipped in the vehicle is charged by connecting a charging gun connected to a charger to the charging inlet 10.

Figure 6:
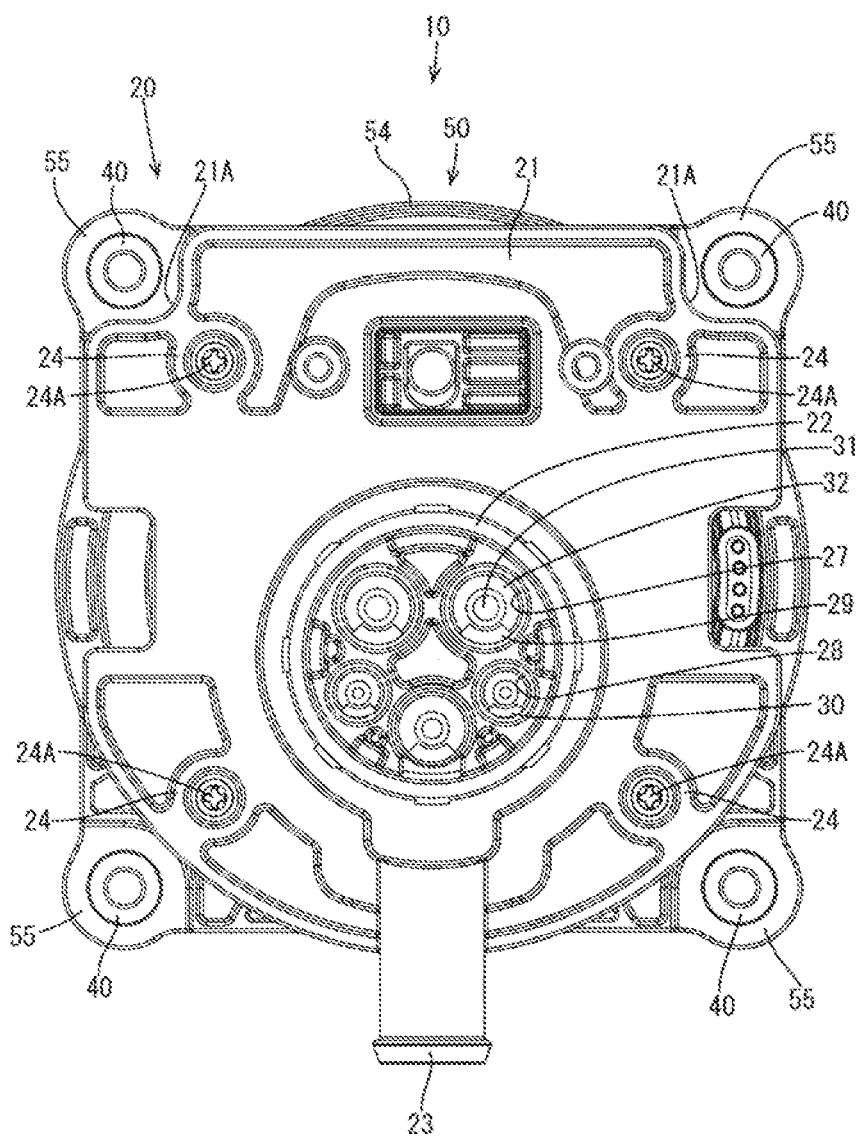
FIG. 6 is a back view of the charging inlet.
Figure 7:
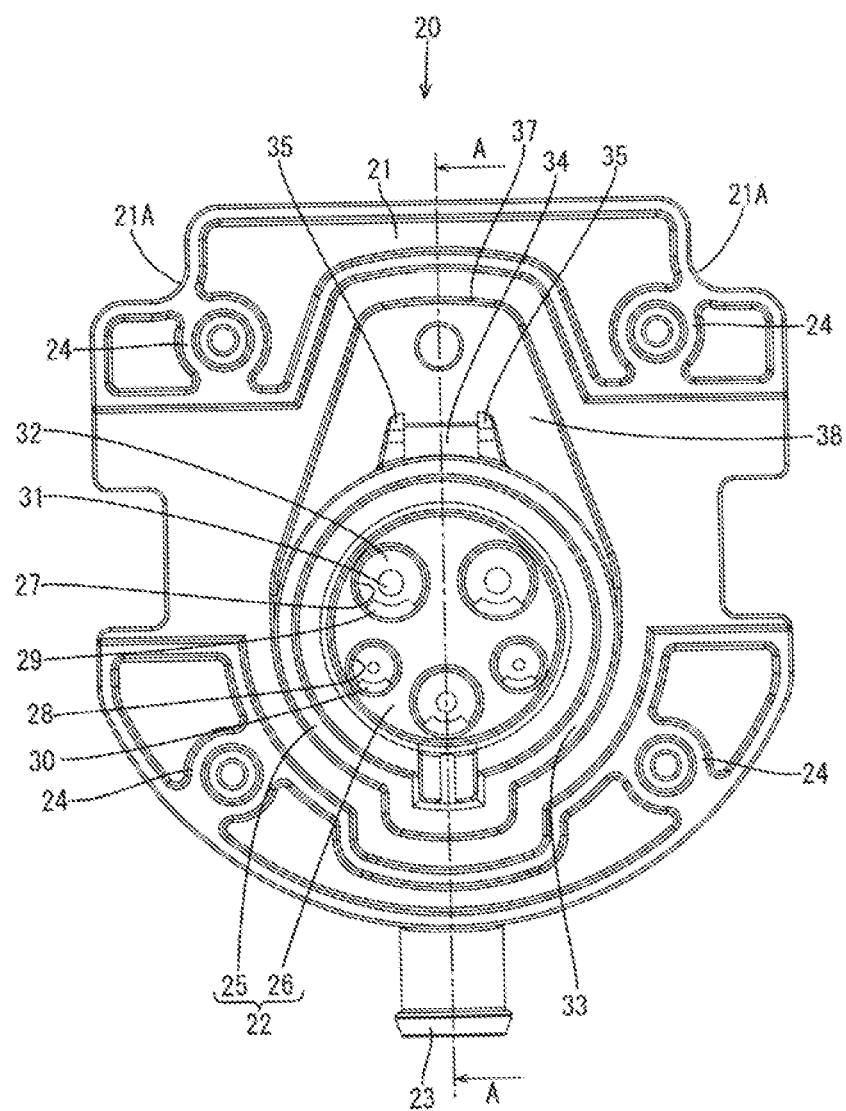
FIG. 7 is a front view of an inlet body.

The inlet body 20 is made of synthetic resin and includes a base plate 21, a connector fitting 22 that penetrates through the base plate 21 in a front-rear direction and a tubular drain 23 that projects down from a part of the connector fitting 22 projecting rearward from the base plate 21. As shown in FIG. 7, plural of fixing portions 24 are provided on an outer peripheral side of the base plate 21. As shown in FIG. 6, the plate 50 is attached and fixed to the inlet body 20 by inserting bolts 24A into the respective fixing portions 24 and tightening the bolts 24A into the plate 50.

As shown in FIG. 7, the connector fitting 22 includes a peripheral wall 25, a terminal accommodating portion 26 provided inside the peripheral wall 25 and a lock 34 provided on the upper surface of the outer periphery of the peripheral wall 25. The terminal accommodating portion 26 is in the form of a circular block when viewed from the front, and large and small cavities 27, 28 penetrate the terminal accommodating portion 26 in the front-rear direction. Large terminals (not shown) for large current are accommodated in the large cavities 27, and small terminals (not shown) for communication are accommodated in the small cavities 28. Large and small drainage holes 29, 30 are provided in lower end parts of the respective cavities 27, 28 and are arcuate when viewed from the front.

Figure 10:
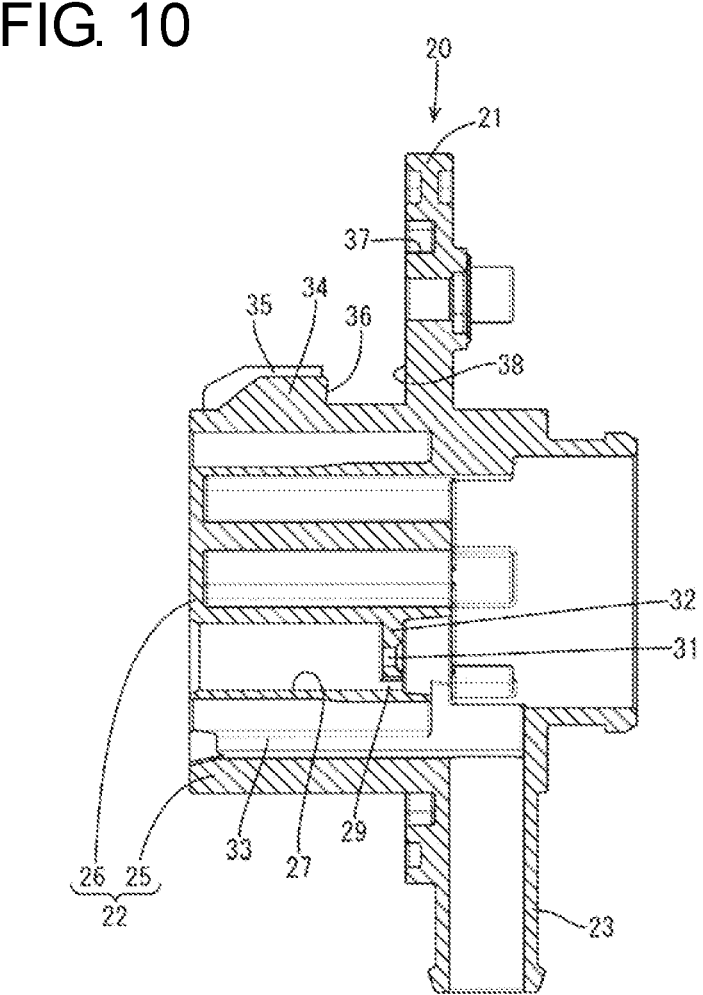
FIG. 10 is a section along A-A in FIG. 7.
Figure 11:
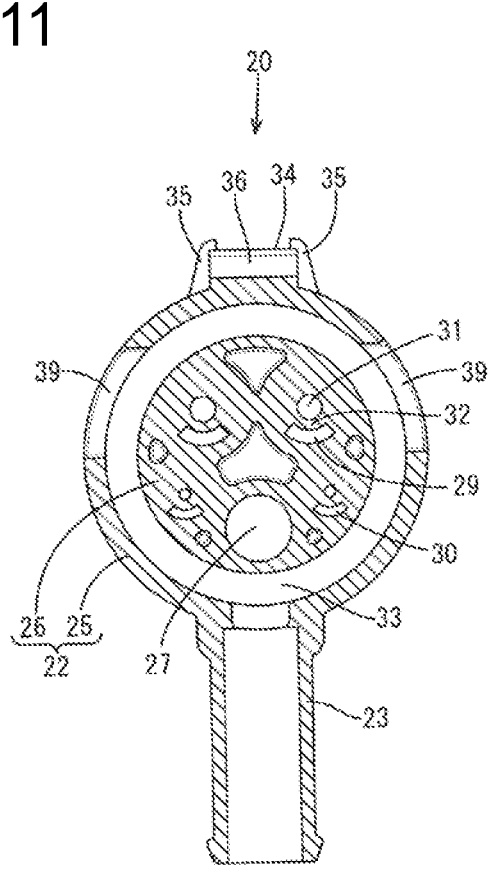
FIG. 11 is a section along B-B in FIG. 8.

As shown in FIG. 10, the large drainage hole 29 is provided at a lower end part of a terminal supporting wall 32 provided with a terminal insertion hole 31. On the other hand, a fitting space 33 is provided between the inner peripheral surface of the peripheral wall 25 and the outer peripheral surface of the terminal accommodating portion 26 for receiving a receptacle (not shown) provided on the charging gun. The fitting space 33 communicates with the large cavities 27 and also with an internal space of the drain 23. Thus, water that intrudes into the large cavities 27 flows into the fitting space 33 through the large drainage holes 29 and is drained to outside through the internal space of the drain 23 from the fitting space 33. Note that the small cavities 28 are not described here but have a drainage structure similar to that of the large cavities 27.

As shown in FIG. 7, lock protection walls 35 are provided integrally on both left and right sides of the lock 34. As shown in FIG. 10, the upper surface of the lock 34 is at a position lower than upper end parts of the lock protection walls 35. Further, the rear surface of the lock 34 serves as a locking surface 36 having an undercut shape and projects farther rearward than rear end parts of the protection walls 35. The locking surface 36 of the lock 34 is formed by laterally removing a mold when molding the inlet body 20, and it is not necessary to remove a mold rearward by providing a mold removal hole behind the base plate 21.

As shown in FIG. 7, a mounting groove 37 for mounting the sealing member 80 is provided circumferentially at a position surrounding the peripheral wall 25 and the lock 34. A lower half of the mounting groove 37 is constituted by the outer peripheral surface of the peripheral wall 25 and an upper half thereof is constituted by the outer peripheral surface of a pedestal 38 coupled to the rear end of the lock 34. An upper edge and left and right side edges of the pedestal 38 constitute a substantially U-shaped outer peripheral shape when viewed from the front, and a lower part of the pedestal 38 has a concave arcuate shape extending along the upper surface of the outer periphery of the peripheral wall 25.

Figure 8:
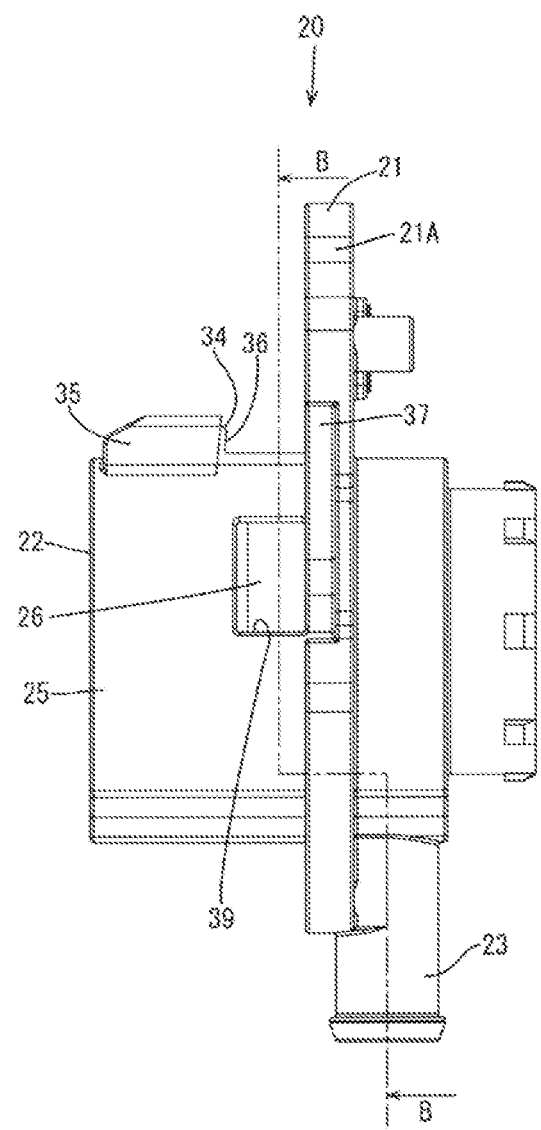
FIG. 8 is a side view of the inlet body.
Figure 9:
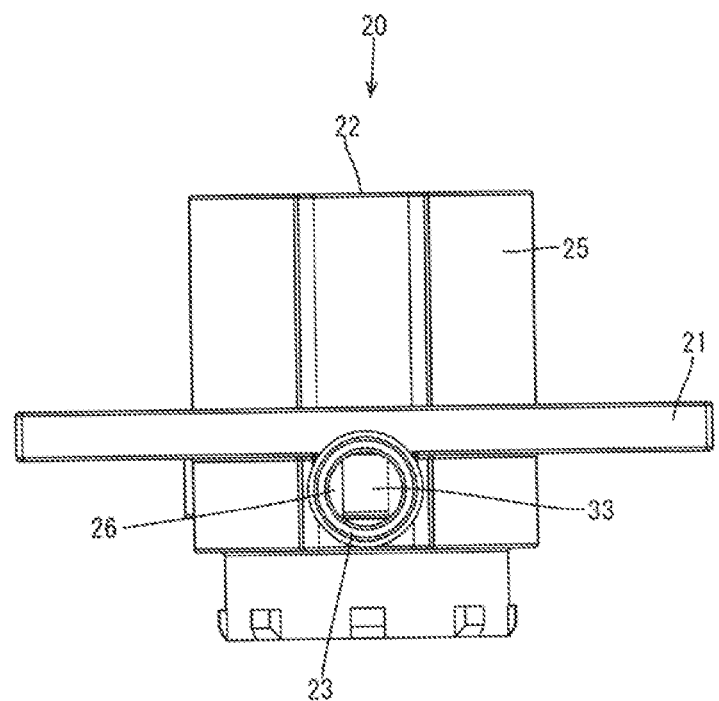
FIG. 9 is a bottom view of the inlet body.

As shown in FIG. 8, drainage ports 39 are provided in outer peripheral side surfaces of the peripheral wall 25. Each drainage port 39 has a vertically long rectangular shape when viewed laterally. Further, the drainage port 39 is formed by laterally removing a mold when molding the inlet body 20. The front edge of the drainage port 39 is substantially aligned with the locking surface 36 of the lock 34 in the front-rear direction, and the rear edge of the drainage port 39 is in contact with the front surface of the base plate 21. As show in FIG. 11, the drainage port 39 communicates with the fitting space 33 of the connector fitting 22. Thus, water that intrudes into the fitting space 33 from the drainage port 39 along the outer peripheral surface of the peripheral wall 25 flows down along the inner peripheral surface of the peripheral wall 25 and is drained to outside through the internal space of the drain 23.

Figure 3:
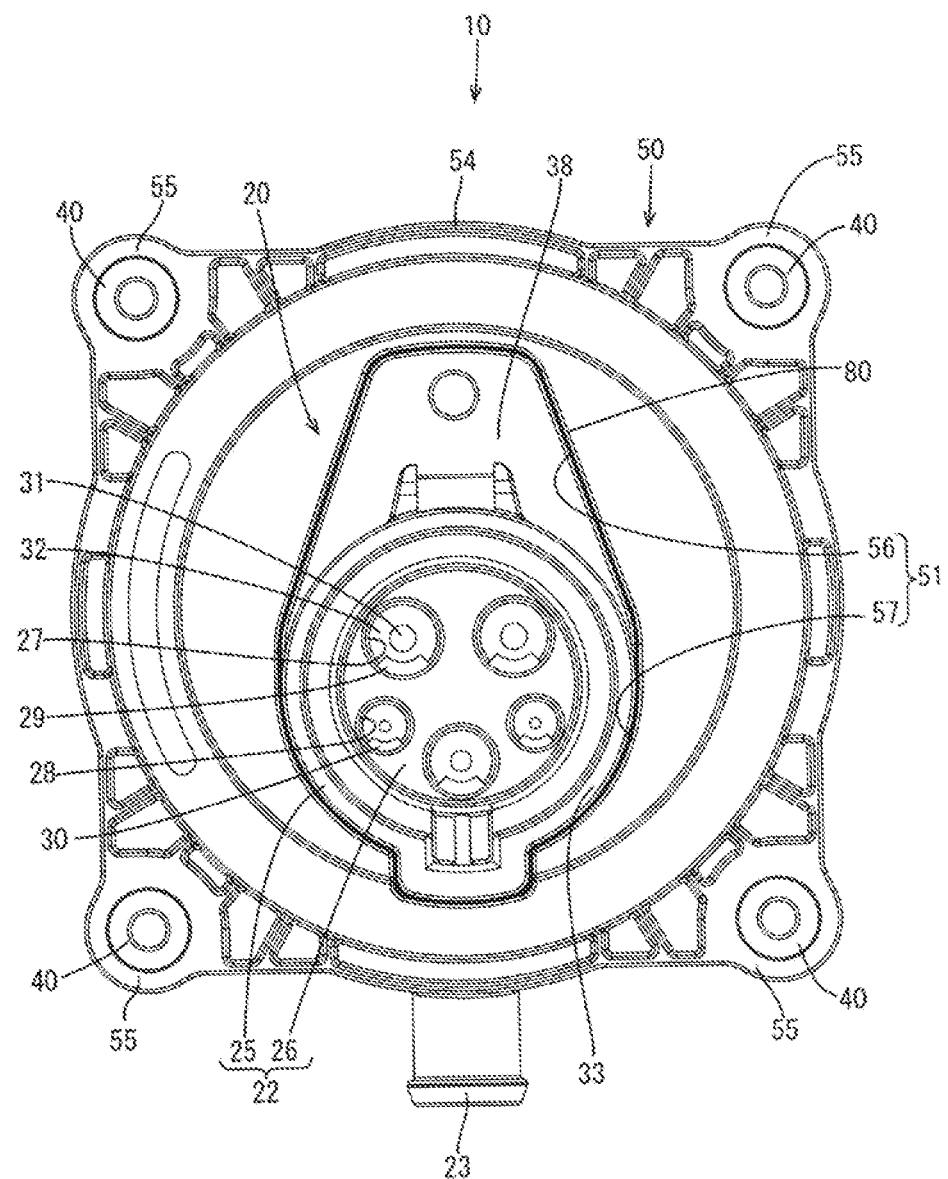
FIG. 3 is a front view of the charging inlet.
Figure 4:
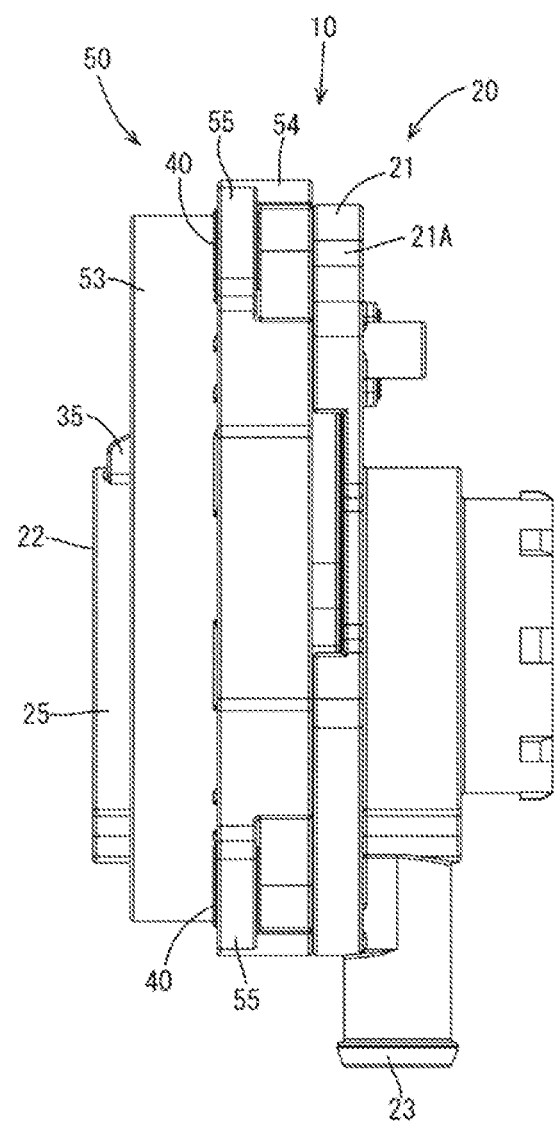
FIG. 4 is a side view of the charging inlet.

The plate 50 is made of synthetic resin and includes a connector insertion hole 51 into which the connector fitting 22 is inserted, as shown in FIG. 2. As shown in FIG. 3, the connector insertion hole 51 is a single hole to which the connector fitting 22 and the pedestal 38 conform to be fittable. In particular, the connector insertion hole 51 is divided into a lock accommodation space 56 having the lock 34 accommodated therein and a peripheral wall accommodation space 57 having the peripheral wall 25 accommodated therein. The drainage ports 39 are provided in a lower end part of the lock accommodation space 56 in the outer peripheral surface of the peripheral wall 25, i.e. left and right drainage ports 39 are provided in the outer peripheral side surfaces of the peripheral wall 25. When the inlet body 20 and the plate 50 are assembled, the sealing member 80 fit on the outer peripheral surfaces of the pedestal 38 and the peripheral wall 24 is sandwiched between these outer peripheral surfaces and the inner peripheral surface of the connector insertion hole 51.

The plate 50 includes an intermediate wall 52 constituting the inner peripheral surface of the connector insertion hole 51, a circular ring-shaped outer tube 53 provided around the intermediate wall 52 and an attaching portion 54 protruding out from the outer peripheral surface of the outer tube 53. As shown in FIG. 3, the attaching portion 54 has a substantially square outer peripheral shape when viewed from the front, and four vehicle fastening portions 55 are provided on four corners of the attaching portion 54 as shown. A collar 40 made of metal is fixed to each vehicle fastening portion 55. As shown in FIG. 5, the charging inlet 10 is fixed to the body 90 by tightening bolts 91 with the collars 40 made of metal held in contact with the body 90 made of metal (metal touch) and sandwiching the body 90 between heads of the bolts 91 and the collars 40. Note that, as shown in FIG. 1, two escaping portions 21A are provided in upper end corner parts of the base plate portion 21 for allowing shafts of the bolts 91 to escape.

Next, functions of this embodiment are described. First, assembling and attaching operations of the charging inlet 10 are described briefly. The sealing member 80 is fit into the mounting groove 37 of the inlet body 20 and the plate 50 is assembled with this inlet body 20. The bolts 24A are inserted into the fixing portions 24 and tightened into the attaching portion 54 of the plate 50. As a result, the sealing member 80 is sandwiched between the inlet body 20 and the plate 50, and the intrusion of water between the inlet body 20 and the plate 50 can be prevented. Thereafter, the charging inlet 10 is attached to the body 90 of the vehicle. The attaching operation is performed by bringing the collars 40 of the vehicle fastening portions 55 of the plate 50 into contact with the body 90 and tightening the bolts 91.

The charging inlet 10 is normally used outside the vehicle. Thus, rainwater and the like may fall on the charging inlet 10. Water adhering to the periphery of the lock 34 flows down while moving toward the base plate 21 (rearward) along the outer peripheral surface of the peripheral wall 25, and enters the fitting space 33 through the drainage ports 39. The water that intrudes into the fitting space 33 flows along the inner peripheral surface of the peripheral wall 25 and flows down along the base plate 21, and is drained to the outside of the vehicle through the inside of the drain 23. Further, the water having intruded into the cavities 27, 28 enters the fitting space 33 through the drainage holes 29, 30, flows down along the base plate 21 and is drained to the outside of the vehicle through the inside of the drain portion 23. As just described, the water adhering to the charging inlet 10 does not intrude to the inside of the vehicle (side behind the base plate 21).

As described above, since the drainage ports 39 are provided in the peripheral wall 25 of the connector fitting 22 according to this embodiment, no drainage port needs to be provided in a rear part of the connector fitting 22. Further, since the plate 50 is provided with the lock accommodation space 56 and the peripheral wall accommodation space 57, the outer peripheral surface of the peripheral wall 25 is facing outside before the inlet body 20 and the plate 50 are assembled, and the drainage ports 39 can be provided by laterally removing a mold in molding the inlet body 20. Thus, it is possible to reduce the number of components and to improve assembly.

The inlet body 20 may include the base plate 21 and the peripheral wall 25 projects on the base plate 21, and the drainage ports 39 may be provided at positions in contact with the base plate 21. The charging inlet 10 generally is attached in such a posture as to face obliquely up to the body 90 of the vehicle. Thus, water pooled on the side of the base plate 21 can be drained directly through the drainage ports 39 by providing the drainage ports 39 at the positions in contact with the base plate 21.

The drainage ports 39 may be provided in the lower end part of the lock accommodation space 56 in the outer peripheral surface of the peripheral wall 25. According to this configuration, water that has intruded into the lock accommodation space 56 can easily flow into the peripheral wall accommodation space 57 through the drainage ports 39 after flowing down to the lower end part of the lock accommodation space 56 along the outer peripheral surface of the peripheral wall 25.

Other Embodiments

The invention is not limited to the above described and illustrated embodiment. For example, the following various modes also are included.

Although the connector insertion hole 51 is composed of the lock accommodation space 56 and the peripheral wall accommodation space 57 in the above embodiment, a space constituting the connector insertion hole may include a space other than the lock accommodation space 56 and the peripheral wall accommodation space 57.

Although the drainage port 39 is provided at the position in contact with the base plate 21 in the above embodiment, a drainage port may be provided at a position distant from the base plate 21.

Although the left and right drainage ports 39 are provided in the outer peripheral side surfaces of the peripheral wall 25 in the above embodiment, only one drainage port 39 may be provided in either one of the outer peripheral side surfaces.

LIST OF REFERENCE SIGNS

10 . . . charging inlet
20 . . . inlet body
21 . . . base plate
22 . . . connector fitting portion
25 . . . peripheral wall
33 . . . fitting space (inside of peripheral wall)
34 . . . lock
39 . . . drainage port
50 . . . holding plate
51 . . . connector insertion hole
56 . . . peripheral wall accommodation space
57 . . . lock portion accommodation space

The invention claimed is:

1. A charging inlet, comprising:
a plate provided with a connector insertion hole; and
an inlet body including a connector fitting to be inserted into the connector insertion hole, the inlet body being fixed to the plate;
wherein:
the connector fitting includes a peripheral wall having a cylindrical shape and a lock provided on an outer peripheral surface of the peripheral wall;
the connector insertion hole includes a peripheral wall accommodation space having the peripheral wall accommodated therein and a lock accommodation space having the lock accommodated therein; and
the peripheral wall is provided with a drainage port allowing communication between the lock accommodation space and an inside of the peripheral wall.

2. The charging inlet of claim 1, wherein the inlet body includes a base plate and the peripheral wall provided to project on the base plate, and the drainage port is provided at a position in contact with the base plate.

3. The charging inlet of claim 2, wherein the drainage port is provided in a lower end part of the lock portion accommodation space in the outer peripheral surface of the peripheral wall.

\* \* \* \* \*